(12) United States Patent
Takeuchi (10) Patent No.: US 9,606,371 B2
(45) Date of Patent: Mar. 28, 2017

(54) IMAGE PICKUP APPARATUS AND CONTROL METHOD

(71) Applicant: CANON KABUSHIKI KAISHA, Tokyo (JP)

(72) Inventor: Kenji Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/551,611

(22) Filed: Nov. 24, 2014

(65) Prior Publication Data

US 2015/0146023 A1 May 28, 2015

(30) Foreign Application Priority Data

Nov. 27, 2013 (JP) .................. 2013-244530

(51) Int. Cl.
*G02B 27/64* (2006.01)
*H04N 5/232* (2006.01)

(52) U.S. Cl.
CPC ......... *G02B 27/646* (2013.01); *H04N 5/2328* (2013.01); *H04N 5/23258* (2013.01); *H04N 5/23287* (2013.01)

(58) Field of Classification Search
CPC ............. H04N 5/2328; H04N 5/23287; H04N 5/23261; G02B 27/64; G02B 27/644; G02B 27/646; G03B 5/02; G03B 2205/0007–2205/0038; G03B 2205/0015
See application file for complete search history.

(56) References Cited

U.S. PATENT DOCUMENTS 8,125,711 B2  2/2012  Kimura
2013/0342715 A1*  12/2013  Nakayama ......... H04N 5/23287
                                                           348/208.11

FOREIGN PATENT DOCUMENTS

JP  2009-258389 A  11/2009

* cited by examiner

*Primary Examiner* — Paul Berardesca
(74) *Attorney, Agent, or Firm* — Cowan, Liebowitz & Latman, P.C.

(57) ABSTRACT

An image shake correcting device includes a shake detecting unit configured to detect a shake of an image pickup apparatus; a first optical correcting unit and a second optical correcting unit configured to correct optically an image shake by using a shake signal output from the shake detecting unit; a first position detecting unit configured to detect a position of the first optical correcting unit and output a first position detection signal; and a calculating unit configured to calculate a target position signal for controlling the first optical correcting unit based on the shake signal. The calculating unit calculates a target position signal for controlling the second optical correcting unit by using the signal that is obtained by subtracting the first position detection signal for detecting the position of the first optical correcting unit controlled by the target position signal from the target position signal.

15 Claims, 9 Drawing Sheets

|  | First image shake correcting unit | Second image shake correcting unit |
| --- | --- | --- |
| Target position for the image shake correction | Image shake detection signal | Residue of the image shake correction of the first image shake correcting unit |
| Correction angle in the image shake correction | wide | narrow |
| Amplification factor of the position detection signal | small | large |
| Frequency band of the return control unit | narrow | wide |

FIG. 9B

|  | First image shake correcting unit | Second image shake correcting unit |
| --- | --- | --- |
| Drive mode | tilt | shift |
| Deterioration in optical performance by the lens driving | less | large |

IMAGE PICKUP APPARATUS AND CONTROL METHOD

BACKGROUND OF THE INVENTION

Field of the Invention

The invention relates to an image pickup apparatus and a control method therefor.

Description of the Related Art

A shake (image shake) of an object image can be caused by the shaking of a user's hand which holds a camera main body (causing a hand shaking) when capturing an image by an image pickup apparatus such as a digital camera. There has been proposed an image pickup apparatus comprising an image shake correcting unit for correcting the image shake.

Optical image shake correction processing and electronic image shake correction processing have been used as conventional correction processing by the image shake correcting unit. The optical image shake correction processing detects vibration applied to a camera main body with an angular velocity sensor or the like. An image shake correcting lens provided in an imaging optical system is moved depending on the result of the detection. Thereby, the image focused in a light-receiving plane of an imaging element is moved to correct the image shake by altering the direction of an optical axis in the imaging optical system. Also, the electronic image shake correction processing is processing for artificially correcting the image shake by performing an image processing on a captured image.

The performance of the image shake correction according to the conventional image shake correcting unit is likely to affect some difference, for example, the difference depending on photographing conditions, characteristics of a photographer's hand shaking, or the like. The difference depending on the characteristics of the photographer's hand shaking may be a difference of frequency band due to the specific photographer's large hand shaking. Also, the difference depending on the photographing conditions is considered to be conditions, for example, when photographing while riding and when photographing while walking or the like. In such conditions, a shake amount capable of correcting the image shake by an image shake correcting unit is required to be larger because an image shake amount is large. However, the size of the image shake correcting unit may be increased to increase the image shake correction amount.

Japanese Patent Laid-Open No. 2009-258389 discloses an image shake correcting device comprising a first movable barrel for holding a first correction member and a second movable barrel for holding a second correction member, and a fixing member between the first movable barrel and the second movable barrel.

Japanese Patent Laid-Open No. 2009-258389 discloses an image shake correcting device for driving the first correction member and the second correction member inversely to obtain a large correction angle with few drive stroke. However, the performance of the image shake correction is reduced depending on the differences between the characteristics of the photographer's hand shaking, the photographing conditions or the like when the correction angle is only expanded, such as the image shake correcting device.

SUMMARY OF THE INVENTION

The present invention provides an image pickup apparatus for preventing a reduction in performance of an image shake correction due to differences depending on the characteristics of a photographer's hand shaking or photographing conditions.

According to an embodiment of the present invention, an image pickup apparatus is provided that includes a shake detecting unit configured to detect a shake of the image pickup apparatus; a first optical correcting unit and a second optical correcting unit configured to correct optically an image shake by using a shake signal output from the shake detecting unit; a first position detecting unit configured to detect a position of the first optical correcting unit and output a first position detection signal; and a calculating unit configured to calculate a target position signal for controlling the first optical correcting unit based on the shake signal, wherein the calculating unit calculates a target position signal for controlling the second optical correcting unit by using the signal obtained by subtracting the first position detection signal, that is output by detecting the position of the first optical correcting unit controlled by the target position signal, from the target position signal.

According to the present invention, an image pickup apparatus can be provided that is not susceptible to the influence of a reduction in performance of the image shake correction due to differences depending on a photographing conditions, a shake amount, or a shake frequency by the user and the like to realize a better image shake correction.

Further features of the present invention will become apparent from the following description of exemplary embodiments (with reference to the attached drawings).

DESCRIPTION OF THE EMBODIMENTS

First Embodiment

Figure 1:
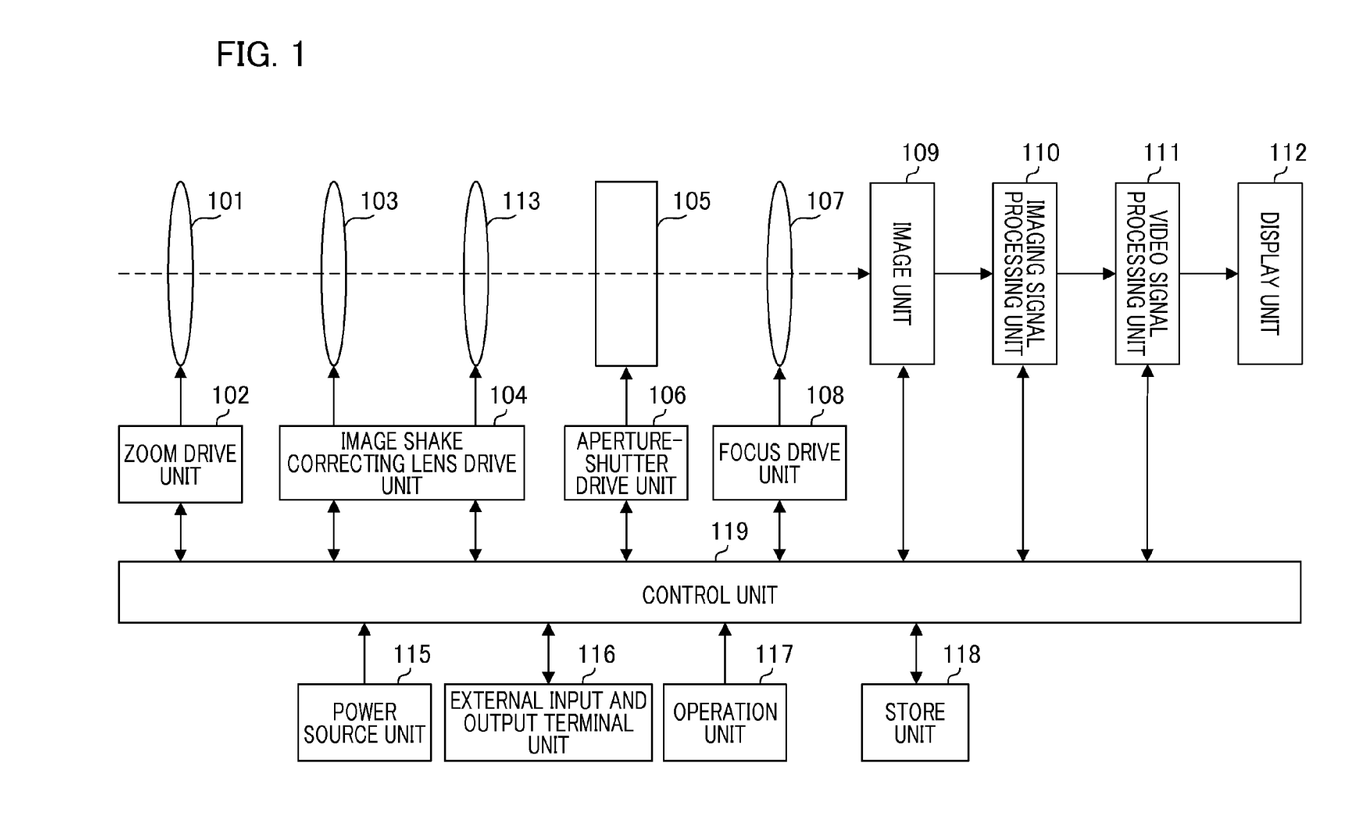
FIG. 1 is a diagram illustrating an exemplary configuration of an image pickup apparatus according to an embodiment of the present invention.

FIG. 1 is a diagram illustrating an exemplary configuration of an image pickup apparatus according to the present embodiment. The image pickup apparatus shown in FIG. 1 is a digital still camera. Also, the image pickup apparatus according to the present embodiment may have a function of moving image photographing.

The image pickup apparatus shown in FIG. 1 comprises a zoom unit 101 to a control unit 119. The zoom unit 101 is a portion of a photographing lens with variable magnification that constitutes an image forming optical system. The zoom unit 101 comprises a zoom lens for altering the magnification of the photographing lens. A zoom drive unit 102 controls a drive of the zoom unit 101 according to the control of the control unit 119. A first image shake correcting lens 103 is a correction member for correcting an image shake. The first image shake correcting lens 103 is configured to be movable in a direction perpendicular to an optical axis of the photographing lens. An image shake correcting lens drive unit 104 controls the drive of the first image shake correcting lens 103. A second image shake correcting lens 113 has a configuration similar to that of the first image shake correcting lens 103. Also, the second image shake correcting lens 113 is drive-controlled by the image shake correcting lens drive unit 104.

An aperture-shutter unit 105 is a mechanical shutter with an aperture function. An aperture-shutter drive unit 106 drives the aperture-shutter unit 105 according to a control of a control unit 119. A focus lens 107 is a portion of the photographing lenses and is configured to enable altering the position of the focus lens 107 according to the optical axis of the photographing lens. A focus drive unit 108 drives the focus lens 107 according to the control of the control unit 119.

An image unit 109 converts an optical image by the photographing lens into an electric signal in pixel units by using an imaging element such as a CCD image sensor and a CMOS image sensor. The "CCD" stands for "Charge Coupled Device". The "CMOS" stands for "Complementary Metal-Oxide". An imaging signal processing unit 110 performs A/D conversion, correlating double sampling, gamma correction, white balance correction, color interpolation processing and the like to convert the electric signal output from the image unit 109 into a video signal. A video signal processing unit 111 processes the video signal output from the imaging signal processing unit 110 depending on the use. More specifically, the video signal processing unit 111 generates a video for display and performs an encoding process and a data filing for recording or the like.

A display unit 112 displays the image as necessary based on the video signal for display which the video signal processing unit 111 outputs. A power source unit 115 supplies the power source to the whole image pickup apparatus depending on the use. An external input and output terminal unit 116 inputs and outputs a communication signal and the video signal between the external input and output terminal unit 116 and an external device. An operation unit 117 comprises a button, a switch or the like to provide an instruction to the image pickup apparatus by the user. A store unit 118 stores a variety of data such as video information. For example, the control unit 119 comprising for example, a CPU, a ROM, and a RAM, deploys the control program stored in the ROM to the RAM to carry out the instruction in the CPU to control each unit of the image pickup apparatus and obtain operation of the image pickup apparatus including a variety of operations as described below. The "CPU" stands for "Central Processing Unit". The "ROM" stands for "Read Only Memory". The "RAM" stands for "Random Access Memory".

The operation unit 117 comprises a release button configured to turn "ON" a first switch (SW1) and a second switch (SW2) in turn depending on a pressing amount. The release switch SW1 turns "ON" when the release button is half-pressed, and the release switch sw2 turns "ON" when the release button is fully-pressed. When the release switch SW1 turns "ON", the control unit 119 calculates an AE evaluation value based on the video signal for a display which the video signal processing unit 111 outputs to the display unit 112. Then, the control unit 119 controls the focus drive unit 108 based on the AE evaluation value to detect the focus automatically.

In addition, the control unit 119 performs AE processing to determine an aperture value and a shutter speed to obtain an appropriate exposure amount based on the information about brightness of the video signal and a predetermined program diagram. When the release switch SW2 is turned "ON", the control unit 119 performs photographing at the determined aperture value and the shutter speed, and controls each of the processing units to store the image data obtained from the image unit 109 to the store unit 118.

The operation unit 117 further comprises an image shake correcting switch capable of selecting a shake correction mode. When the shake correction mode is selected by the image shake correcting switch, the control unit 119 instructs the image shake correcting lens drive unit 104 to perform the image shake correcting operation until the instruction of "image shake correcting-off" is issued. Also, the operation unit 117 comprises a photographing-mode select switch capable of selecting either a still image photographing mode or a moving image photographing mode. The control unit 119 can alter the operation condition of the image shake correcting lens drive unit 104 according to the selection of the photographing mode by the operation of the photographing-mode select switch. The image shake correcting device according to the present embodiment is composed of the image shake correcting lens drive unit 104.

Also, the operation unit 117 comprises a play-mode select switch for selecting a play mode. When the play mode is selected by operating the play mode select switch, the control unit 119 stops the operation for the image shake correction. Also, the operation unit 117 comprises a magnification change switch for performing the instruction for the change of the zoom magnification. When the instruction for the change of the zoom magnification is performed by operating the magnification change switch, the zoom drive unit 102 that has received the instruction via the control unit 119 drives the zoom unit 101 to move the zoom unit 101 to the instructed zoom position.

Figure 2:
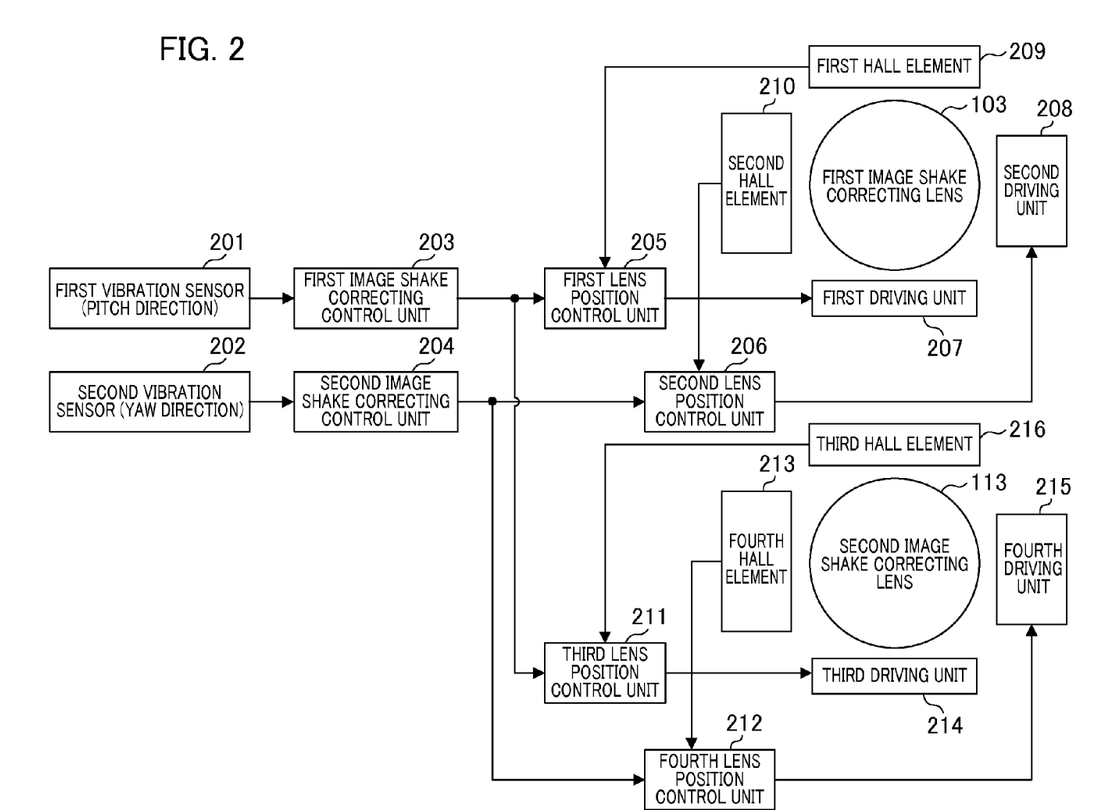
FIG. 2 is a diagram illustrating a configuration of an image shake correcting device according to an embodiment of the present invention.

FIG. 2 is a diagram illustrating a configuration of the image shake correcting device according to the present embodiment. A first vibration sensor 201 is, for example, an angular velocity sensor, and detects vibration in a direction perpendicular to the image pickup apparatus (pitch direction) in a natural attitude (an attitude in which the direction of the image closely fits the horizontal direction). A second vibration sensor 202 is, for example, an angular velocity sensor, and detects vibration in a direction parallel to the image pickup apparatus in the natural attitude (yaw direction). A first image shake correcting control unit 203 outputs a correction position control signal of the image shake correcting lens in the pitch direction to control a drive of the image shake correcting lens. A second image shake correcting control unit 204 outputs the correction position control signal of the image shake correcting lens in the yaw direction to control the drive of the image shake correcting lens.

A first lens position control unit 205 performs feedback control from the correction position control signal in the pitch direction from the first image shake correcting control unit 203 and the position information of the image shake correcting lens in the pitch direction from a first Hall element 209. Thereby, the first lens position control unit 205 drives, for example, a first driving unit 207 that is an actuator. Also, a second lens position control unit 206 performs the feedback control from the correction position control signal in the yaw direction from the second image shake correcting control unit 204 and the position information of the image shake correcting lens in the yaw direction from a second Hall element 210. Thereby, the second lens position control unit 206 drives, for example, a second driving unit 208 that is the actuator.

Next, a description will be given of the drive control operation of the first image shake correcting lens 103 by the image shake correcting lens drive unit 104. A shake signal (angular velocity signal) representing a shake in the pitch direction of the image pickup apparatus is supplied from the first vibration sensor 201 to the first image shake correcting control unit 203. Also, the shake signal (angular velocity signal) representing the shake in the yaw direction of the image pickup apparatus is supplied from the second vibration sensor 202 to the second image shake correcting control unit 204.

The first image shake correcting control unit 203 generates the correction position control signal for driving the first image shake correcting lens 103 in the pitch direction based on the supplied shake signal and outputs the correction position control signal to the first lens position control unit 205. Also, the second image shake correcting control unit 204 generates the correction position control signal for driving the first image shake correcting lens 103 in the yaw direction based on the supplied shake signal and outputs the correction position control signal to the second lens position control unit 206.

The first Hall element 209 outputs the signal having a voltage depending on magnetic field strength by a magnet disposed in the first image shake correcting lens 103 as the position information of the first image shake correcting lens 103 in the pitch direction. The second Hall element 210 outputs the signal having a voltage depending on magnetic field strength by the magnet disposed in the first image shake correcting lens 103 as the position information of the first image shake correcting lens 103 in the yaw direction. The position information is supplied to the first lens position control unit 205 and the second lens position control unit 206.

The first lens position control unit 205 controls the feedback while driving the first driving unit 207 so that the signal value from the first Hall element 209 converges to a correction position control signal value from the first image shake correcting control unit 203. Also, the second lens position control unit 206 controls the feedback while driving the second driving unit 208 so that the signal value from the second Hall element 210 converges to the correction position control signal value from the second image shake correcting control unit 204.

Note that the output of the first Hall element 209 and the second Hall element 210 is adjusted so that the first image shake correcting lens 103 is moved to the predetermined position with respect to the predetermined correction position control signal because the position signal value output from the first Hall element 209 and the second Hall element 210 are variable.

The first image shake correcting control unit 203 outputs the correction position control signal for moving the position of the first image shake correcting lens 103 to cancel the image shake of the object image based on the shake information from the first vibration sensor 201. The second image shake correcting control unit 204 outputs the correction position control signal for moving the position of the first image shake correcting lens 103 to cancel the image shake based on the shake information from the second vibration sensor 202.

For example, the first image shake correcting control unit 203 and the second image shake correcting control unit 204 generate a correction speed control signal or a correction position control signal by performing filter processing or the like on the shake information (angle velocity signal) or the shake information. By the above operation, if there is vibration such as a hand shaking at the image pickup apparatus when photographing, the image shake can be prevented to a certain level of vibration. Also, the first image shake correcting control unit 203 and the second image shake correcting control unit 204 detect a panning state of the image pickup apparatus based on the shake information from the first vibration sensor 201 and the second vibration sensor 202, and the output of the first Hall element 209 and the second Hall element to perform a panning control.

The drive control of the second image shake correcting lens 113 by the image shake correcting lens drive unit 104 is similar to that of the first image shake correcting lens 103 by the image shake correcting lens drive unit 104. In other words, the first image shake correcting control unit 203 generates the correction position control signal for driving the second image shake correcting lens 113 in the pitch direction based on the supplied shake signal and outputs the correction position control signal to a third lens position control unit 211. Also, the second image shake correcting control unit 204 generates the correction position control signal for driving the second image shake correcting lens 113 in the yaw direction based on the supplied shake signal and outputs the correction position control signal to a fourth lens position control unit 212.

The third lens position control unit 211 controls feedback while driving a third driving unit 214 so that a signal value from a third Hall element 216 converges to the correction position control signal value from the first image shake correcting control unit 203. Also, the fourth lens position control unit 212 controls the feedback while driving a fourth driving unit 215 so that the signal value from a fourth Hall element 213 converges to the correction position control signal value from the second image shake correcting control unit 204.

In the present embodiment, the first image shake correcting control unit 203, the first lens position control unit 205, and the first driving unit 207 correct the low-frequency components of the shake signal in the pitch direction. Also, the first image shake correcting control unit 203, the third lens position control unit 211, and the third driving unit 214 correct the high-frequency components of the shake signal in the pitch direction.

Also, the second image shake correcting control unit 204, the second lens position control unit 206, and the second driving unit 208 correct the low-frequency components of the shake signal in the yaw direction. Also, the second image shake correcting control unit 204, the fourth lens position control unit 212, and the fourth driving unit 215 correct the high-frequency components of the shake signal in the yaw direction.

Figure 3:
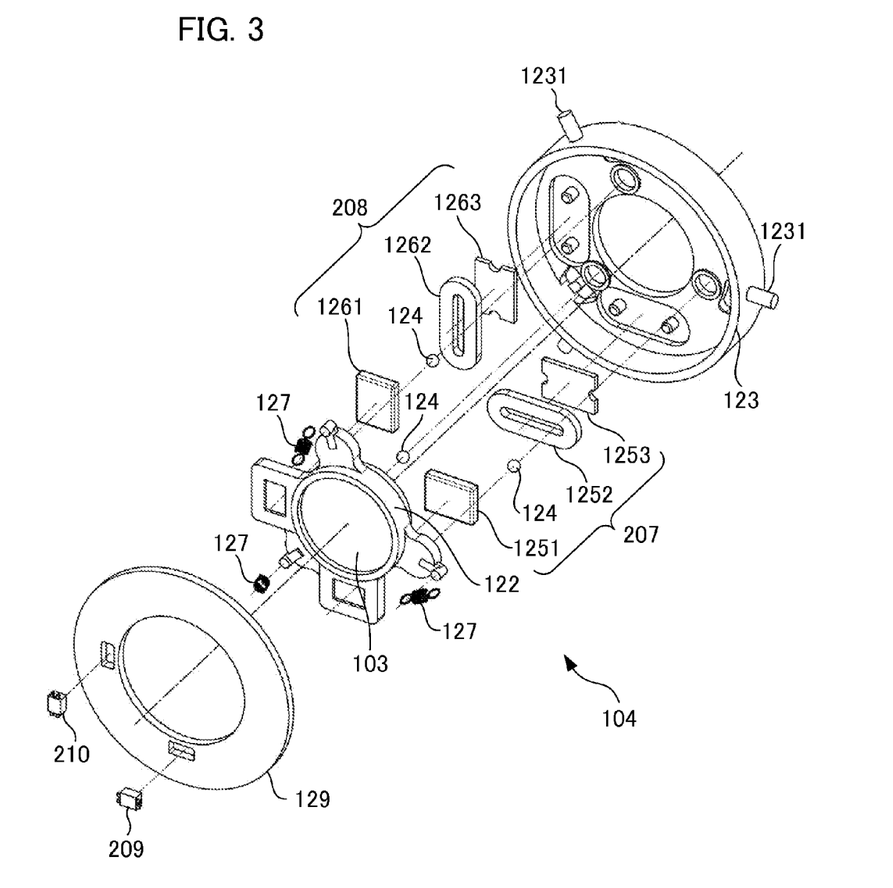
FIG. 3 is an exploded perspective view of an image shake correcting lens drive unit.

FIG. 3 is an exploded perspective view of an image shake correcting lens drive unit 104. The image shake correcting lens drive unit 104 comprises the first image shake correcting lens 103, a movable barrel 122, a fixed base plate 123, a rolling ball 124, a first electromagnetic drive unit 207, and a second electromagnetic drive unit 208. Also, the image shake correcting lens drive unit 104 comprises an urging spring 127, a first position sensor 209, a second position sensor 210, and a sensor holder 129.

The first electromagnetic drive unit 207 comprises a first magnet 1251, a first coil 1252, and a first yoke 1253. The second electromagnetic drive unit 208 comprises a second magnet 1261, a second coil 1262, and a second yoke 1263.

The first image shake correcting lens 103 is a first correcting optical member capable of offsetting an optical axis. The first image shake correcting lens 103 is drive-controlled by the first image shake correcting control unit 203 and the second image shake correcting control unit 204. Thereby, an image shake correction operation for moving an optical image for passing through the image optical system is performed to ensure stability of the image on an imaging plane. Note that while a correcting lens is used as a correction optical system according to the present embodiment, an imaging unit such as the CCD to a photographing optical system may be driven to ensure the stability of the image on the imaging plane. In other words, the imaging unit may be used as a unit for correcting the image shake.

The movable barrel 122 is a first movable portion for holding the first image shake correcting lens 103 at the central opening. The movable barrel 122 holds the first magnet 1251 and the second magnet 1252. Also, the movable barrel 122 comprises three rolling ball receivers and is supported so as to be capable of moving in the plane perpendicular to the optical axis by the rolling ball 124. Also, the movable barrel 122 comprises three spring hooks, which are capable of holding one end of the urging spring 127.

The fixed base plate 123 is a first fixing member formed into a cylinder shape. The fixed base plate 123 comprises three followers 1231 on the outer circumference unit. The movable barrel 122 is arranged at the central opening of the fixed base plate 123. Thereby, the movable amount of the movable barrel 122 can be limited.

Also, the fixed base plate 123 holds the first coil 1252 and the first yoke 1253 at the point where the fixed base plate 123 faces the magnetized surface of the first magnet 1251. Also, the fixed base plate 123 holds the second coil 1262 and the second magnet yoke 1263 at the point where the fixed base plate 123 faces the magnetized surface of the second magnet 1261. Also, the fixed base plate 123 comprises three rolling ball receivers and holds movably the movable barrel 122 in the plane perpendicular to the optical axis through the rolling ball 124. In addition, the fixed base plate 123 comprises three spring hooks, which hold one end of the urging spring 127.

In this example, the first electromagnetic drive unit 207 is the well-known voice coil motor. An electric current is passed through the first coil 1252 attached to the fixed base plate 123 to generate the Lorentz force between the first magnet 1251 fixed to the movable barrel 122 and the fixed base plate 123 to drive the movable barrel 122. The second electromagnetic drive unit 208 is arranged similarly to the voice coil motor of the first electromagnetic drive unit 207 rotated by 90 degrees, and thus, a detailed description thereof will be omitted.

The urging spring 127 is a tensile spring that generates an urging force proportional to the deformed amount. One end of the urging spring 127 is fixed to the movable barrel 122 and the other end that is fixed to the fixed base plate 123 to generate the urging force therebetween. The rolling ball 124 is held by this urging force to keep the contact state with the fixed base plate 123 and the movable barrel 122.

The position sensor 209 and the position sensor 210 are two magnetic sensors with a Hall element that reads the magnetic flux of the first magnet 1251 and the second magnet 1261. The movement in the plane of the movable barrel 122 can be detected from the change of the output.

The sensor holder 129 is configured in a substantial disk-shaped and fixed to the fixed base plate 123. The two position sensors 209 and 210 can be held at the position where the position sensors face the first magnet 1251 and the second magnet 1261. Also, the sensor holder 129 can house the movable barrel 122 inside the space formed together with the fixed base plate 123. Thereby, the inside units can be prevented from falling away even when an impact force is applied to the image shake correcting device or the difference of the attitude is varied. The image shake correcting lens drive unit 104 can allow the first image shake correcting lens 103 to move to any position in the plane perpendicular to the optical axis according to the configuration described above.

Figure 4:
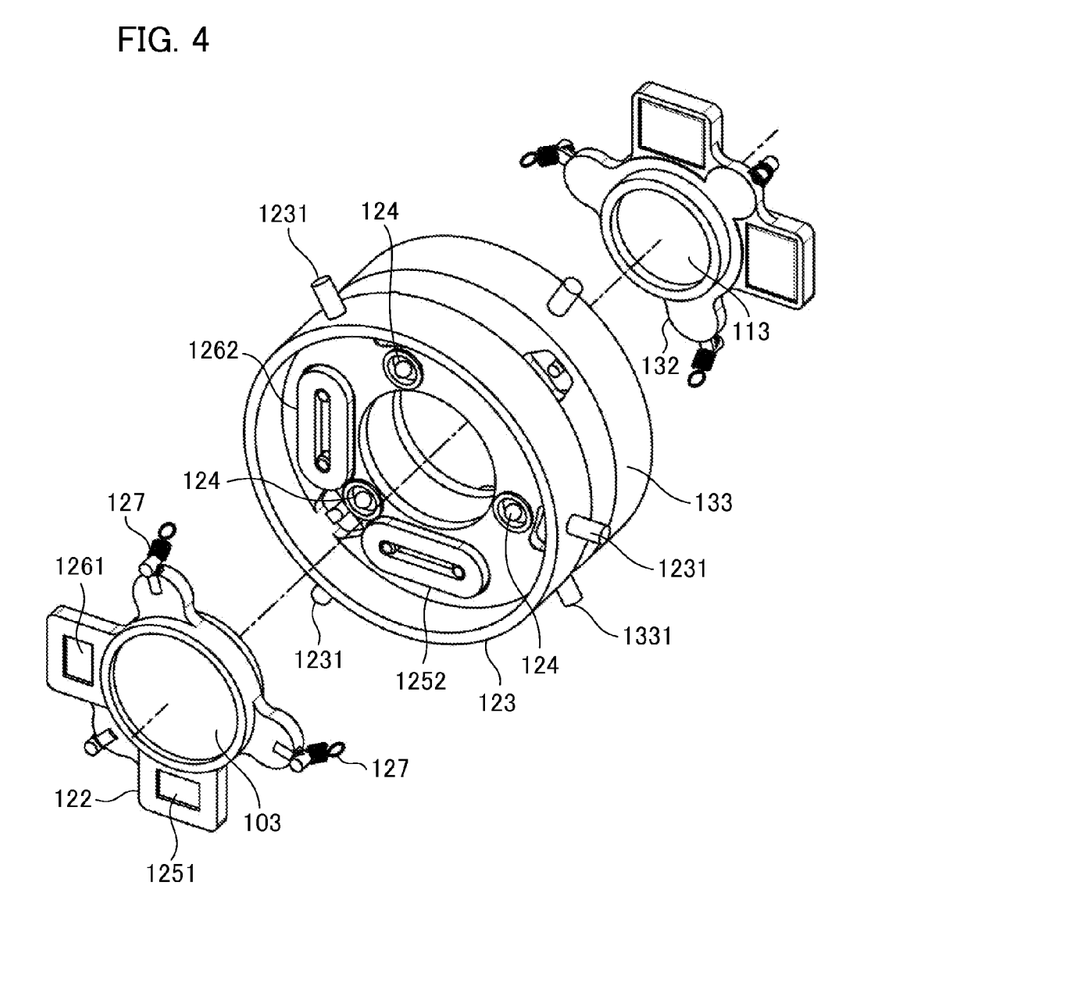
FIG. 4 is a diagram illustrating a configuration of the image shake correcting lens drive unit.

FIG. 4 is a diagram illustrating a positional relationship of the image shake correcting lens drive unit comprising the first image shake correcting lens 103 and the second image shake correcting lens 113 respectively. A part of the image shake correcting lens drive unit is exploded or omitted for the same of explanation in FIG. 4. The movable barrel 132 is a second movable unit in the image shake correcting lens drive unit 104 for holding the second image shake correcting lens 113 at the central opening. The fixed base plate 133 is a second fixing member in the image shake correcting lens drive unit 104 with the second image shake correcting lens 113. The image shake correcting lens drive unit 104 with the second image shake correcting lens 113 has a configuration similar to that of the image shake correcting lens drive unit 104 with the first image shake correcting lens 103, except for the shape of the lens and the movable barrel 132 holding the lens, and thus, a detailed description thereof will be omitted.

Figure 5:
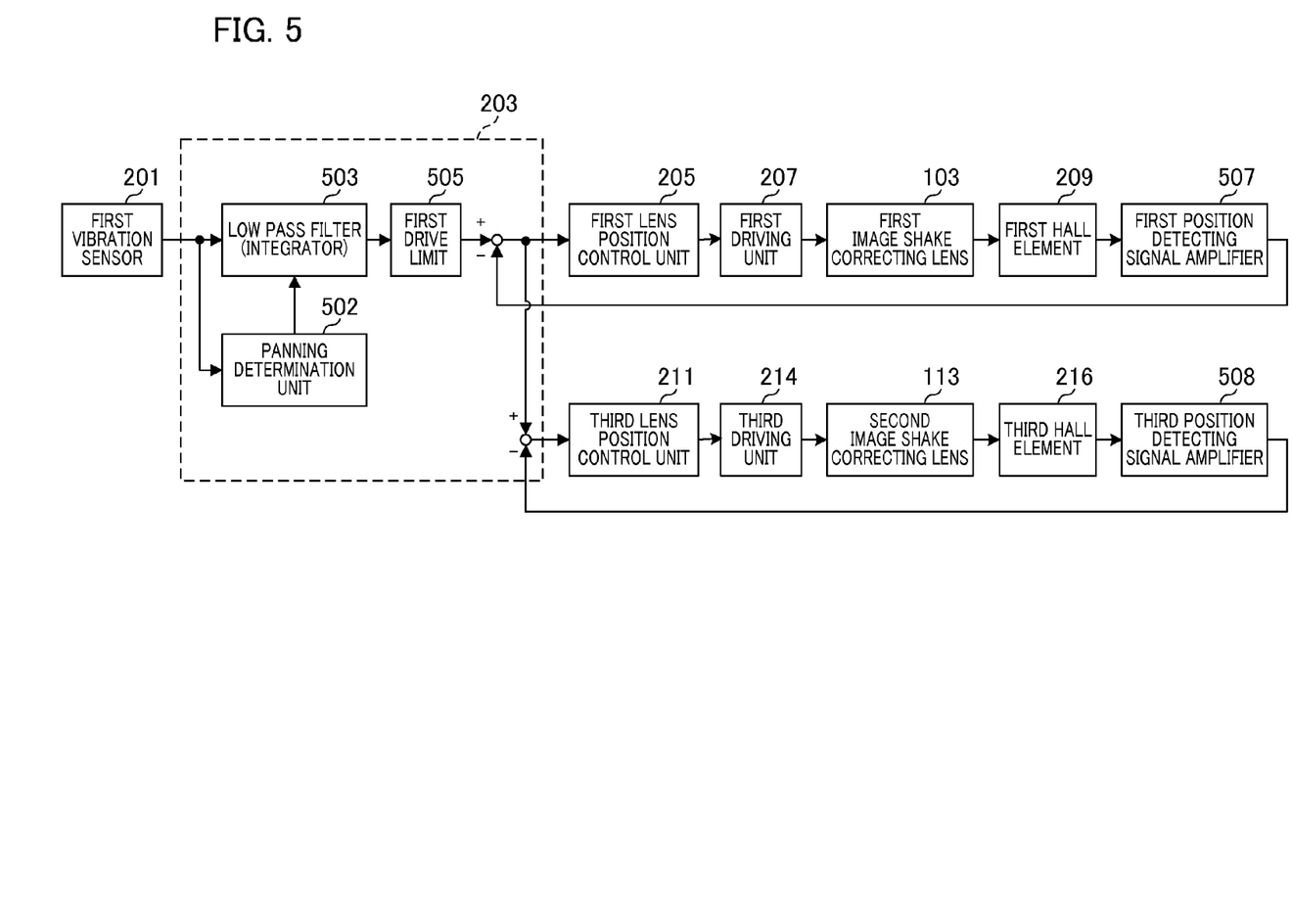
FIG. 5 a block diagram illustrating a configuration inside of an image shake correcting control unit and a lens control unit according to a first embodiment of the present invention.

FIG. 5 is a diagram illustrating a mechanism for correcting a shake signal in a pitch direction in the image shake correcting device according to the present embodiment. A mechanism for correcting the shake signal in the yaw direction is realized by the second image shake correcting control unit 204, the second lens position control unit 206, the fourth lens position control unit 212, the second driving unit 208, and the fourth driving unit 215 being similar to that shown in FIG. 4, and thus, a description thereof will be omitted.

In FIG. 5, the first vibration sensor 201 detects a shake information signal (angle velocity signal) applied to the image pickup apparatus. The first image shake correcting control unit 203 comprises a LPF (low pass filter) 503, a panning determination unit 502, and a first drive limit 505. The image shake signal detected by the first vibration sensor 201 is integrated by the LPF 503 with which the time constant until the filter becomes stable is variable to generate a shake angle signal from which only the low-frequency components are extracted. The phrase "A time constant until the filter becomes stable is variable" means, for example, that the coefficient of the filter is varied to allow a cut-off frequency to be variable, or that the buffer for holding the result of the calculation (median) in the filter calculation can be rewritten freely at any timing.

The panning determination unit 502 determines the panning operation of the image pickup apparatus to perform time constant change processing until the filter of the LPF 503 becomes stable. More specifically, the panning determination unit 502 determines that the panning operation is done if the shake signal detected by the first vibration sensor 201 is over a predetermined value. The panning determination unit 502 may determine that the panning operation is done if the current positions of the first image shake correcting lens 103 and the second image shake correcting lens 113 are over the predetermined value. Also, the panning determination unit 502 may determine that the panning operation is done if the target positions of the first image shake correcting lens 103 and the second image shake correcting lens 113 are over the predetermined value. Thereby, the first image shake correcting lens 103 and the second image shake correcting lens 113 can be prevented from being driven above the movable range and the photographing image can be prevented from being unstable due to a swing-back immediately after the panning operation if a large shake is applied to the image pickup apparatus.

The target position of the first image shake correcting lens generated from the low-frequency components of a hand shake angle signal generated above is input to the first lens position control unit 205 after a drive amount is limited in a first drive limit 505. Also, the signal for subtracting the position information of the first image shake correcting lens 103, which amplified by a first position detecting signal amplifier 507 from the target position of the first image shake correcting lens, is held as the target position of the second image shake correcting lens 113.

The position information of the first image shake correcting lens 103 that has been detected by the first Hall element 209 is compared to the lens target position output from the first drive limit 505 after the amplification to the predetermined amplitude by the first position detecting signal amplifier 507. Then, the image shake correcting operation is carried out by the position feedback control through the first driving unit 207.

Also, the position information of the second image shake correcting lens 113 that has been detected by the third Hall element 216 is compared to the target position of the second image shake correcting lens after the amplification to the predetermined amplitude by a third position detecting signal amplifier 508. Then, the image shake correcting operation is carried out by the position feedback control through the third driving unit 214.

As described above, the result of subtracting the position information of the first image shake correcting lens 103 amplified by a first position detecting signal amplifier 507 from the target position of the first image shake correcting lens denotes a remainder of the image shake correction by the first image shake correcting lens. The target position of the second image shake correcting lens 113 is determined in order to remove the remainder of this image shake correction by the drive of the second image shake correcting lens. The reason why the remainder occurs in the first image shake correcting lens is considered to affect the drive characteristics (friction influences and influences of the external disturbances such as the attitude) of the first image shake correcting lens, the responsiveness and a control band of the first lens position control unit and the like.

In the first lens position control unit 205 and the third lens position control unit 211, any control calculators may be used. In the example, a PID controller is used as the first lens position control unit 205 and the third lens position control unit 211.

Figure 6:
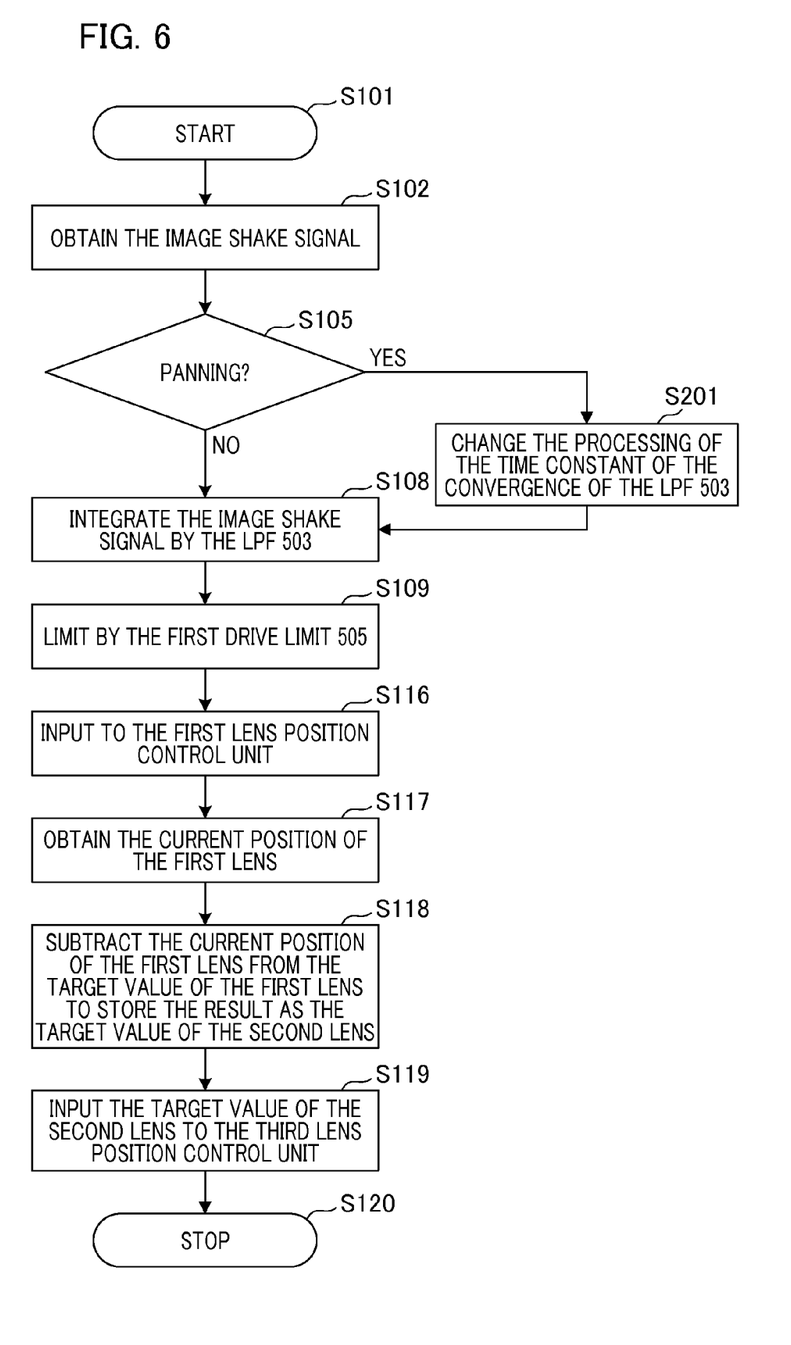
FIG. 6 is a flow chart illustrating processing for calculating a target position of an image shake correcting lens according to a first embodiment of the present invention.

FIG. 6 is a flow chart illustrating processing for calculating a target position of an image shake correcting lens according to the present embodiment. Firstly, when the processing is started (step S101), the first vibration sensor obtains an image shake signal (step S102).

Next, the panning determination unit 502 determines whether the image pickup apparatus is at the panning operation (panning) or not (step S105). If the image pickup apparatus is determined to be panning, it allows the time constant until the LPF 503 becomes stable to be short (step S201). If the image pickup apparatus is not determined to be panning, the processing for altering the time constant is not performed, and the processing goes to step S108.

In step S108, the LPF 503 integrates the obtained output value to transform it from angle velocity information to angle information (step S108). Then, the first drive limit 505 limits the output value of the LPF 503 to the predetermined amplitude (step S109).

Then, in step S109, the output value of the LPF 503 is limited to the predetermined amplitude by the first drive limit 505 to be input to the first lens position control unit 205 (step S116). Thereby, the first image shake correcting lens is driven.

Next, the current position of the first image shake correcting lens 103 is obtained from a first detecting amplifier 507 (step S117). Then, the current position obtained in step S117 is subtracted from the target position of the first image shake correcting lens calculated in step S109 and stored as the target position of the second image shake correcting lens (step S118).

Next, the target position of the second lens stored in the step S118 is input to the third lens position control unit 211 (step S119) to drive the second image shake correcting lens. Thereby, the first and second image shake correcting lenses can be driven according to the image shake signal applied to the image pickup apparatus to remove the influence of the image shake applied to the image pickup apparatus.

Note that, in the present embodiment, the value that subtracts the current position from the target position of the first image shake correcting lens is input without changes as the target position of the second image shake correcting lens because the relationship of the image shake correction angle to the drive stroke of the first image shake correcting lens is assumed to be same as that of the second image shake correcting lens. However, if the correction angle to the drive stroke of the first image shake correcting lens is different from that of the second image shake correcting lens, the value that subtracts the current position from the target position of the first image shake correcting lens is multiplied by a coefficient in consideration of the image shake correction angle to the drive stroke of the second image shake correcting lens. In this case, the multiplied result must be input to the third lens position control unit as the target position of the second lens.

Figure 9A:
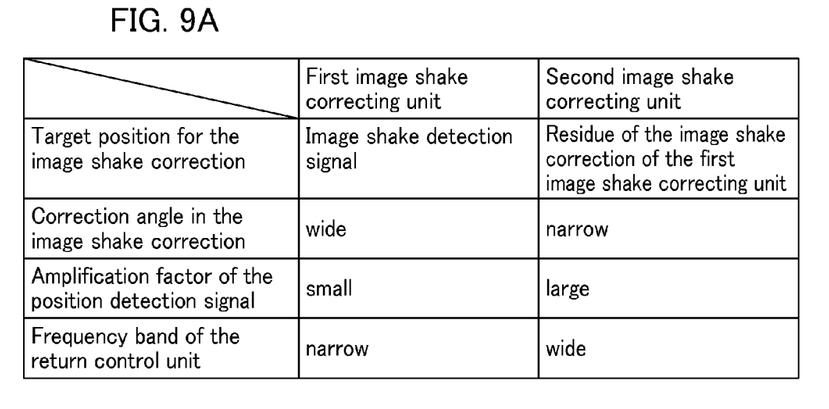
FIGS. 9A and 9B are tables illustrating a control condition of a first and a second image shake correcting lenses.
Figure 9B:
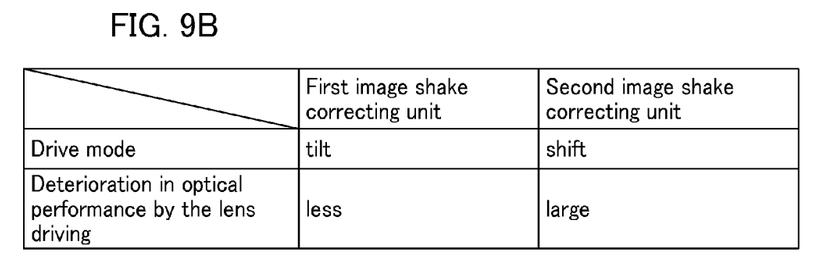

Here, a description will be given of the drive condition of a first image shake correcting unit and a second image shake correcting unit in an image shake correcting device according to the present embodiment referring to FIGS. 9A and 9B. In this example, the first image shake correcting lens 103 functions as the first image shake correcting unit. Also, the second image shake correcting lens 113 functions as a second image shake correcting unit. Note that the first image shake correcting unit is a tilt lens and the second image shake correcting unit is a shift lens in the present embodiment. However, these configurations are not intended to a limitation and they may be replaced by each other.

(Target Position of the Image Shake Correction)

A method for determining the target position of the image shake correction of the first and second image shake correcting units drives firstly the first image shake correcting unit to perform the image shake correction according to the image shake signal. Then a remainder of the image shake correction is calculated by subtracting the current position from the target position of the first image shake correcting unit. The remainder is set to be a target position of the image shake correction of the second image shake correcting unit.
(Correction Angle in the Image Shake Correction)

The image shake correction angle of the first image shake correcting unit is set so as to be wider than that of the second image shake correcting unit because the remainder of the correction that has not been corrected by the first image shake correcting unit is set to be a target position of the second image shake correcting unit after the removal of the large image shake components by the first image shake correcting unit and generally, the target position of the second image shake correcting unit is smaller than that of the first image shake correcting unit. Thereby, the method for correcting the image shake can be divided into a correcting unit configured to correct the image shake mainly with the large drive stroke and a correcting unit configured to remove only the remainder of the correction with the small stroke secondarily to allow the mechanical configuration of the second image shake correcting unit to be smaller than that of the first image shake correcting unit.
(Deterioration in Optical Performance by the Lens Driving)

Generally, when the drive amount of the image shake correcting unit becomes larger, the peripheral light amount, the resolution, and the aberration tend to deteriorate. Thereby, the first image shake correcting unit is set to a configuration so as not to cause deterioration in the optical performance due to the lens driving compared to the second image shake correcting unit because the drive amount for the image shake correction is likely to be large in the first correcting unit.
(Drive Mode of the Image Shake Correcting Lens)

In the drive mode of the image shake correcting lens, the deterioration in optical performance of the well-known tilt mode to the optical axis is less than that of the shift mode in the plane perpendicular to the optical axis. Accordingly, the first image shake correcting lens 103 in the first correcting unit is set to the drive mode in the tilting direction, and the second image shake correcting lens 113 in the second correcting unit is set to the shift drive mode.
(Arrangement Position of the Lens)

Generally, when the lens is arranged closer to the side of the object image, the lens has the larger image shake correction angle and less deterioration in optical performance with respect to the drive amount of the image shake correcting unit. Therefore, in the present embodiment, the first image shake correcting lens 103 is moved closer to the object image than the second image shake correcting lens 113.
(Amplification Factor of the Position Detection Signal)

A signal output from the Hall element (Hall element signal) is a position detection signal of the image shake correcting lens. In the amplification factor of the position detecting signal amplifier for amplifying the Hall element signal to the predetermined magnification for detecting the position of the image shake correcting unit, the amplification factor of the first image shake correcting unit is set to be smaller than that of the second image shake correcting unit. This allows the large amplification factor for the Hall signal of the position detecting signal amplifier to improve the resolution for detecting the position. However, if the electric signal after the amplification is obtained digitally by an AD converter or the like, a dynamic range is often not expanded within a limited voltage range. The amplification factor of the first image shake correcting unit in the dynamic range, which has high probability of driving significantly is set to be small in order to balance the resolution with the dynamic range. Also, the amplification factor of the second image shake correcting unit for correcting only the remainder of the correction by the first image shake correcting lens, which has a small drive stroke but causes many small shakes, is set to be large to allow the resolution of the position detection to be higher. More specifically, the signal amplification factor by the first position detecting signal amplifier 507 that is a first signal amplifying unit is reduced rather than the signal amplification factor by the third position detecting signal amplifier 508 that is a second signal amplifying unit.
(Frequency Band of a Return Control Unit)

In the remaining components of the correction that is not corrected by the first image shake correcting unit, the components that has the large amplitude at the low-frequency is mainly removed. Also, a large portion of the remaining components of the correction has generally the high-frequency components that cause by the influences of the external disturbance. Therefore, frequency band of a return control unit of the second image shake correcting unit for correcting the remaining correction of the image shake correction of the first image shake correcting unit (a second feedback controlling unit) is set to be higher than that of the first image shake correcting unit (a first feedback controlling unit).
(Image Shake Correction Angle to the Lens Drive Stroke)

The image shake correction angle to the same drive stroke is different depending on the type of the image shake correcting lens because of its optical characteristics. The first image shake correcting unit uses a lens with an image shake correction angle that is obtained to drive the drive stroke. The angle is larger than that of the second image shake correcting unit because the first image shake correcting unit requires the lens with larger image shake correction angle than that of the second image shake correcting unit.

The establishment described above can provide an image shake correcting device for making the size of the mechanical configuration of the first image shake correcting unit that requires a large drive stroke that is as small as possible to obtain a significant effect for the shake correction without the increase in the size of the apparatus in the present embodiment.

Second Embodiment

Figure 7:
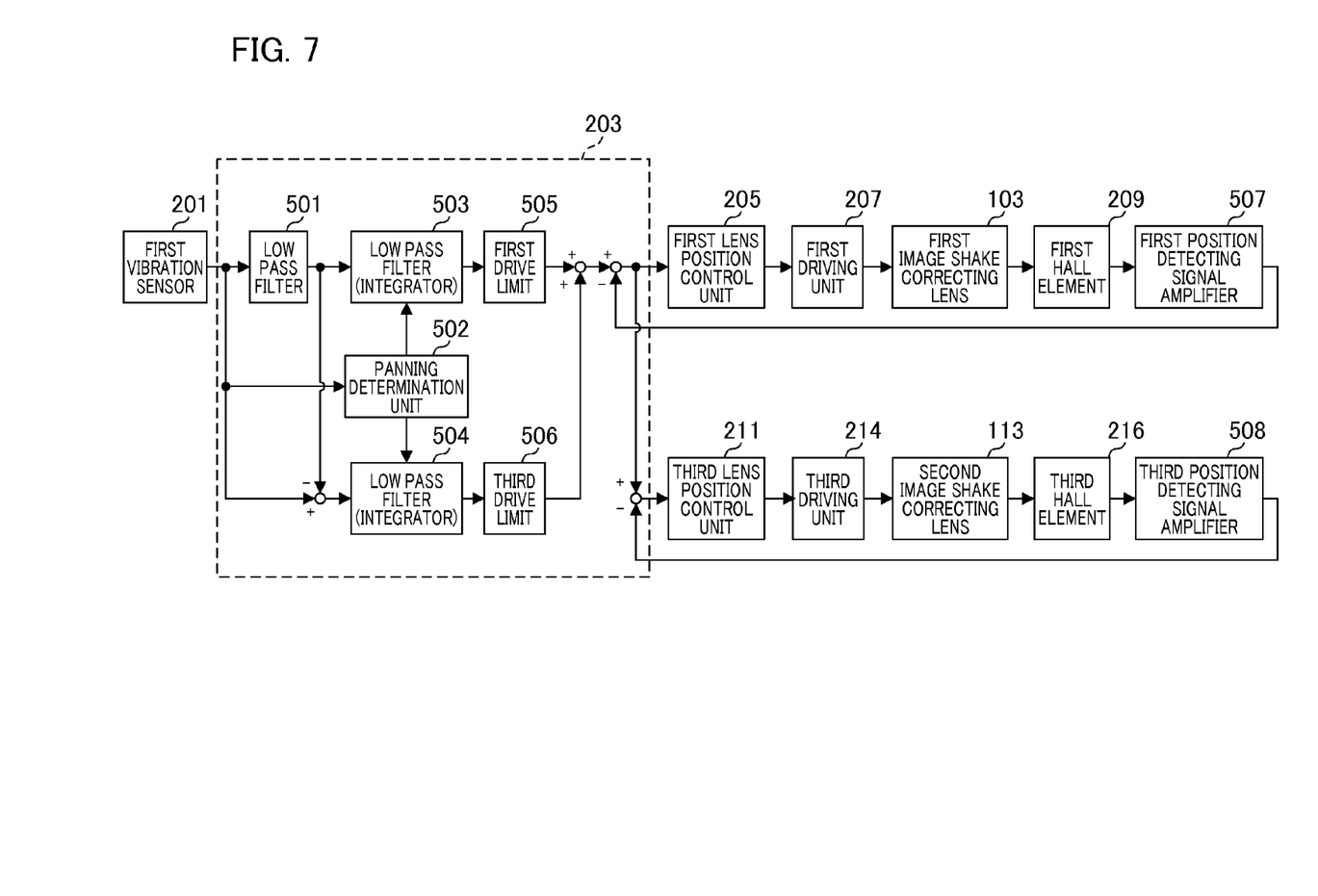
FIG. 7 is a block diagram illustrating a configuration inside of the image shake correcting control unit and the lens control unit according to a second embodiment of the present invention.

In the present embodiment, except for the configuration of the image shake correcting control unit 203, its configuration is the same as that of the first embodiment comprising the drive condition of the first and third image shake correcting lenses and the like, and thus, a description thereof will be omitted. FIG. 7 illustrates a configuration inside of a first image shake correcting control unit 203, a first lens position control unit 205, and a third lens position control unit 211. Note that a second image shake correcting control unit 204, a second lens position control unit 206, and a fourth lens position control unit 212 has an inside configuration that is the same as those shown in FIG. 7 and thus, a description thereof will be omitted.

In FIG. 7, the low pass filter (LPF) 501 extracts the low frequency components from the image shake signal detected by the first vibration sensor 201. If the panning determination unit 502 determines the panning operation, the panning determination unit 502 performs the time constant change processing until the filter of the LPF 503 and the LPF 504 become stable. The image shake signal of the low-frequency extracted by the LPF 501 is integrated by the LPF 503, for which the time constant until the filter becomes stable is variable, to generate a shake angle signal extracting only the low-frequency components.

The low-frequency components extracted by the LPF 501 are subtracted from the image shake signal detected by the first vibration sensor 201 to extract high-frequency components from the image shake signal. The extracted high-frequency components are integrated by the LPF 504 to transform them from the angle velocity information to the angle information to generate the shake angle signal extracting only the high-frequency components. The shake angle signals of the low-frequency and the high-frequency generated as described above limit the drive amount to the target position of the image shake correcting lens generated from the low-frequency components with the first drive limit 505. Also, the target position of the image shake correcting lens generated from the high-frequency components is combined after the limitation of the drive amount by the third drive limit 506 and input to the first lens position control unit 206 as the target position of the first image shake correcting lens. Also, the signal for subtracting the position information of the first image shake correcting lens 103 amplified by the first position detecting signal amplifier 507 from the target position of the first image shake correcting lens is input to the third lens position control unit 211 as the target position of the second image shake correcting lens 113.

Figure 8:
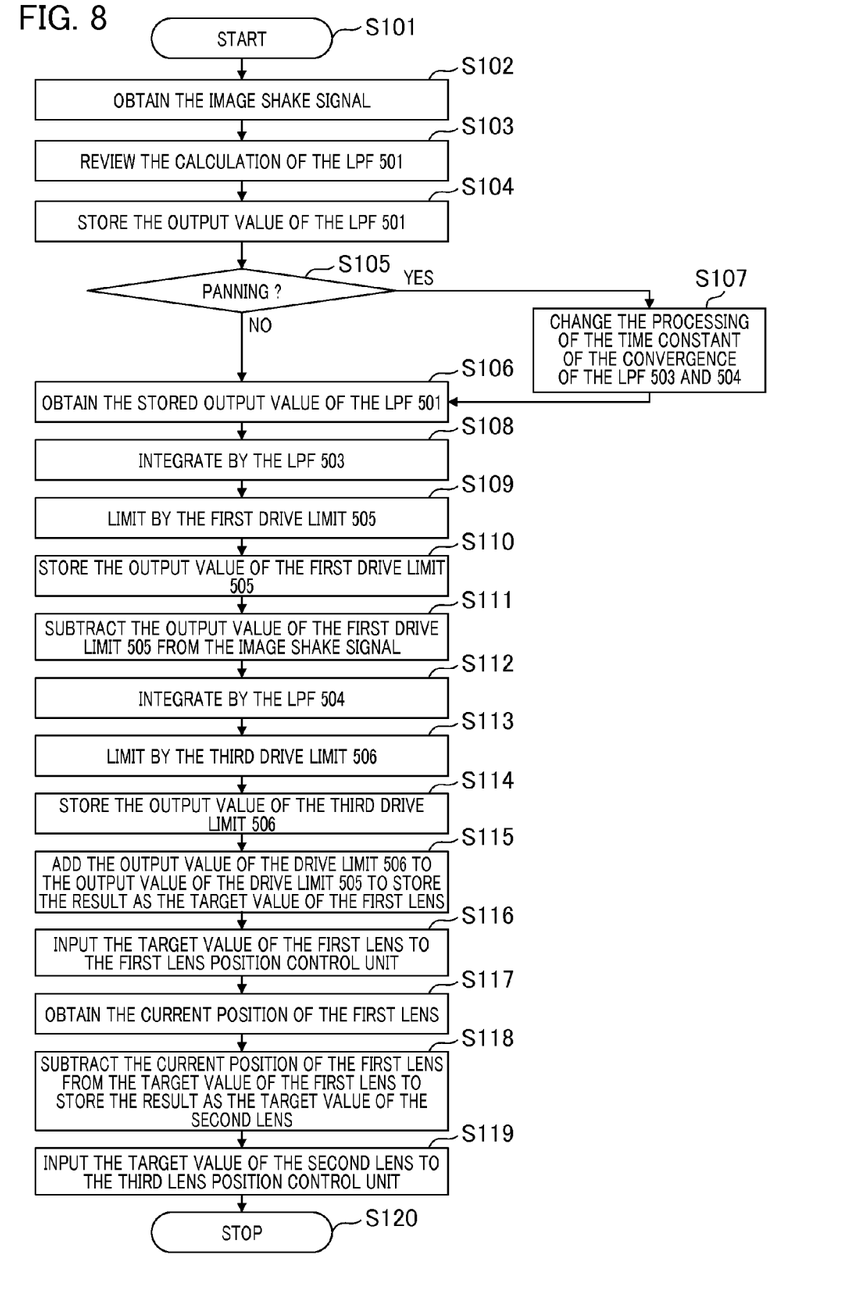
FIG. 8 is a flow chart illustrating processing for calculating the target position of the image shake correcting lens according to a second embodiment of the present invention.

FIG. 8 is a flow chart illustrating processing for calculating a target position of the image shake correcting lens according to a second embodiment of the present invention. Firstly, the processing is started (step S101) to obtain the image shake signal by the first vibration sensor 201 (step S102). Next, the LPF 501 performs the calculation for dividing the frequency band of the hand shaking signal (step S103) to store the result of the calculation of the LPF 501 as the low-frequency components of the hand shaking signal to the memory (step S104).

Next, the panning determination unit 502 determines whether the image pickup apparatus is at the panning operation (panning) or not (step S105). If the image pickup apparatus is determined to be panning, it allows the time constant until the LPF 503 and 504 become stable to be short (step S107). If the image pickup apparatus is not determined to be panning, the processing for altering the time constant is not performed, and the processing goes to a step S106.

In the step S106, the LPF 503 obtains the output value of the LPF 501 stored to the memory in the step S104 (step S106). Then the LPF 503 integrates the obtained output value and transforms it from the angle velocity information to the angle information (step S108). Next, the first drive limit 505 limits the output valve of the LPF 503 to the predetermined amplitude (step S109) and inputs the output value of the LPF 503 to the first lens position control unit 205 (step S110). Thereby, the first image shake correcting lens 103 is driven.

Next, the output value of the LPF 501 stored in the step S104 is subtracted from the image shake signal obtained in the step S102 (step S111) to extract the high-frequency components of the image shake signal. Thereby, the hand shake signal is divided into the low-frequency components and the high-frequency components at the cut-off frequency set by the LPF 501.

The LPF 504 integrates the high-frequency components of the extracted hand shaking signal to transform it from the angle velocity signal to the angle signal (step S112). Then, the third drive limit 506 limits the output value of the LPF 504 to the predetermined amplitude (step S113), and stores it to the memory (step S114).

Next, the output value is obtained by adding the high-frequency signal and the low-frequency signal of the target value of the image shake correcting unit calculated in steps S109 and S113, and stored as the target position of the first lens (step S115). Then the stored target position of the first lens is input to the first lens position control unit 206 (step S116). Thereby, the first image shake correcting lens 103 is driven.

Next, the current position of the first image shake correcting lens 103 is obtained from the first position detecting signal amplifier 507 (step S117). Then, the current position obtained in the step S117 is subtracted from the target position of the first image shake correcting lens calculated in the step S109, and the result is stored as the target position of the second image shake correcting lens (step S118).

Next, the target position of the second lens stored in the step S118 is input to the third lens position control unit 211 (step S119) to drive the second image shake correcting lens. Thereby, the first and second image shake correcting lenses are driven according to the image shake signal applied to the image pickup apparatus to remove the influence of the image shake applied to the image pickup apparatus.

As described above, the present embodiment can also provide an image shake correcting device for preventing the reduction in the image shake correcting performance due to the difference depending on the characteristics of the photographer's hand shaking or the photographing conditions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244530, filed Nov. 27, 2013, which is hereby incorporated by reference herein in its entirety.

What is claimed is:
1. An image shake correcting apparatus comprising:
a first optical correcting unit and a second optical correcting unit configured to correct optically an image shake by using a shake signal output from a shake detecting unit;

a first position detecting sensor configured to output a first position detection signal related to a position of the first optical correcting unit; and a controller configured to calculate a first target position signal for controlling the first optical correcting unit based on the shake signal, wherein the first optical correcting unit has a correcting lens and corrects the image shake by relatively moving the correcting lens with respect to an optical axis of an imaging optical system, wherein the second optical correcting unit has a second correcting lens which is different from the correcting lens and corrects the image shake by relatively moving the second correcting lens with respect to the optical axis, and wherein the controller calculates a second target position signal for controlling the second optical correcting unit by using the signal obtained by subtracting the first position detection signal related to the position of the first optical correcting unit controlled by the first target position signal, from the first target position signal.

2. An image shake correcting apparatus comprising:
a first optical correcting unit and a second optical correcting unit configured to correct optically an image shake by using a shake signal output from a shake detecting unit;
a first position detecting sensor configured to output a first position detection signal related to a position of the first optical correcting unit;
a second position detecting sensor configured to output a second position detection signal related to a position of the second optical correcting unit; and
a controller configured to calculate a first target position signal for controlling the first optical correcting unit based on the shake signal,
wherein the controller calculates a second target position signal for controlling the second optical correcting unit by using the signal obtained by subtracting the first position detection signal related to the position of the first optical correcting unit controlled by the first target position signal, from the first target position signal, and
wherein a range for detecting the position of the first position detecting sensor is wider than that of the second position detecting sensor.

3. The image shake correcting apparatus according to claim 2, wherein a first shake signal, which is the shake signal for controlling the first optical correcting unit, is a signal of low-frequency components extracted from the shake signal output from the shake detecting unit, and a second shake signal, which is the shake signal for controlling the second optical correcting unit, is a signal of high-frequency components extracted from the shake signal output from the shake detecting unit.

4. The image shake correcting apparatus according to claim 2, wherein an image shake correction angle of the first optical correcting unit is wider than that of the second optical correcting unit.

5. The image shake correcting apparatus according to claim 2, wherein the first optical correcting unit has the optical element having a deterioration in optical performance less than that of the second optical correcting unit.

6. The image shake correcting apparatus according to claim 2, wherein a drive mode of the first optical correcting unit is a drive mode for tilting the first optical correcting unit to an optical axis of an imaging optical system of the image shake correcting apparatus, and wherein a drive mode of the second optical correcting unit is a drive mode for shifting the second optical correcting unit in a direction perpendicular to the optical axis.

7. The image shake correcting apparatus according to claim 2, wherein the first optical correcting unit is arranged closer to an object in the optical axis direction relative to the second optical correcting unit.

8. The image shake correcting apparatus according to claim 2, wherein resolution for detecting the position of the first optical correcting unit is less than that of the second optical correcting unit.

9. The image shake correcting apparatus according to claim 2, further comprising:
a first feedback controller configured to control feedback for a current position of the first optical correcting unit; and
a second feedback controller configured to control feedback for a current position of the second optical correcting unit,
wherein a frequency band of the second feedback controller is wider than that of the first feedback controller.

10. An image shake correcting apparatus comprising:
a first optical correcting unit and a second optical correcting unit configured to correct optically an image shake by using a shake signal output from a shake detecting unit;
a first position detecting sensor configured to output a first position detection signal related to a position of the first optical correcting unit; and
a controller configured to calculate a first target position signal for controlling the first optical correcting unit based on the shake signal,
wherein the first optical correcting unit has a correcting lens and corrects the image shake by relatively moving the correcting lens with respect to an optical axis of an imaging optical system,
wherein the second optical correcting unit has a second correcting lens which is different from the correcting lens and corrects the image shake by relatively moving the second correcting lens with respect to the optical axis, and
wherein the controller calculates a second target position signal for controlling the second optical correcting unit by using a signal that is calculated by using the first target position signal and the first position detection signal related to the position of the first optical correcting unit controlled by the first target position signal.

11. An imaging method, the method comprising:
correcting optically an image shake by using a shake signal output from a shake detecting unit by a first optical correcting unit and a second optical correcting unit;
outputting a first position detection signal related to a position of the first optical correcting unit; and
calculating a first target position signal for controlling the first optical correcting unit based on the shake signal,
wherein the first optical correcting unit has a correcting lens and corrects the image shake by relatively moving the correcting lens with respect to an optical axis of an imaging optical system,
wherein the second optical correcting unit has a second correcting lens which is different from the correcting lens and corrects the image shake by relatively moving the second correcting lens with respect to the optical axis, and
wherein the calculating calculates a second target position signal for controlling the second optical correcting unit by using the signal obtained by subtracting the first position detection signal related to the position of the first optical correcting unit controlled by the first target position signal, from the first target position signal.

12. An imaging method, the method comprising:
correcting optically an image shake by using a shake signal output from a shake detecting unit by a first optical correcting unit and a second optical correcting unit;
outputting a first position detection signal related to a position of the first optical correcting unit;
calculating a first target position signal for controlling the first optical correcting unit based on the shake signal,
wherein the first optical correcting unit has a correcting lens and corrects the image shake by relatively moving the correcting lens with respect to an optical axis of an imaging optical system,
wherein the second optical correcting unit has a second correcting lens which is different from the correcting lens and corrects the image shake by relatively moving the second correcting lens with respect to the optical axis, and
wherein the calculating calculates a second target position signal for controlling the second optical correcting unit by using a signal that is calculated by using the first target position signal and the first position detecting signal related to the position of the first optical correcting unit controlled by the first target position signal.

13. An image shake correcting apparatus comprising:
a first optical correcting unit and a second optical correcting unit configured to have an optical element and correct optically an image shake by using a shake signal output from a shake detecting sensor;
a first position detecting sensor configured to output a first position detection signal related to a position of the first optical correcting unit;
a second position detecting sensor configured to output a second position detection signal related to a position of the second optical correcting unit; and
a controller configured to calculate a first target position signal for controlling the first optical correcting unit based on the shake signal,
wherein the controller calculates a second target position signal for controlling the second optical correcting unit by using a signal that is calculated by using the first target position signal and the first position detection signal related to the position of the first optical correcting unit controlled by the first target position signal, and
wherein a range for detecting the position of the first position detecting sensor is wider than that of the second position detecting sensor.

14. An imaging method, the method comprising:
correcting optically an image shake by using a shake signal output from a shake detecting unit by a first optical correcting unit and a second optical correcting unit;
outputting a first position detection signal related to a position of the first optical correcting unit by a first position detecting sensor;
outputting a second position detection signal related to a position of the second optical correcting unit by a second position detecting sensor; and
calculating a first target position signal for controlling the first optical correcting unit based on the shake signal,
wherein the calculating calculates a second target position signal for controlling the second optical correcting unit by using the signal obtained by subtracting the first position detection signal related to the position of the first optical correcting unit controlled by the first target position signal, from the first target position signal, and
wherein a range for detecting the position of the first position detecting sensor-is wider than that of the second position detecting sensor.

15. An imaging method, the method comprising:
correcting optically an image shake by using a shake signal output from a shake detecting unit by a first optical correcting unit and a second optical correcting unit;
outputting a first position detection signal related to a position of the first optical correcting unit by a first position detecting sensor;
outputting a second position detection signal related to a position of the second optical correcting unit by a second position detecting sensor; and
calculating a first target position signal for controlling the first optical correcting unit based on the shake signal,
wherein the calculating calculates a second target position signal for controlling the second optical correcting unit by using a signal that is calculated by using the first target position signal and the first position detection signal related to the position of the first optical correcting unit controlled by the first target position signal, and
wherein a range for detecting the position of the first position detecting sensor is wider than that of the second position detecting sensor.

* * * * *